United States Patent [19]

Pizzuto

[11] 4,008,493
[45] Feb. 15, 1977

[54] MAGNETIC HEAD STRUCTURE WITH MINIMUM FEEDTHROUGH

[76] Inventor: John N. Pizzuto, 52 Verleye Ave., East Northport, N.Y. 11731

[22] Filed: July 11, 1975

[21] Appl. No.: 595,293

[52] U.S. Cl. ............................. 360/124; 360/66; 360/123
[51] Int. Cl.² ..................... G11B 5/20; G11B 5/44
[58] Field of Search ....... 360/124, 123, 121, 65–66

[56] References Cited
UNITED STATES PATENTS

| | | | |
|---|---|---|---|
| 2,483,123 | 9/1949 | Clapp | 360/123 |
| 2,713,676 | 7/1955 | Flemming, Jr. | 360/124 |
| 2,727,096 | 12/1955 | Singer | 360/66 |
| 2,986,608 | 5/1961 | Pettus et al. | 360/124 |
| 3,165,592 | 1/1965 | Brette | 360/124 |
| 3,585,314 | 6/1971 | Korn | 360/65 |
| 3,591,733 | 7/1971 | Pflughaup | 360/124 |
| 3,959,824 | 5/1976 | Ohi et al. | 360/124 |

FOREIGN PATENTS OR APPLICATIONS 803,624  10/1958  United Kingdom ............... 360/124

*Primary Examiner*—Alfred H. Eddleman
*Attorney, Agent, or Firm*—Hane, Sullivan & Spiecens

[57] ABSTRACT

A magnetic head structure comprising a read transducer (head) and a write transducer (head) longitudinally disposed for operating on the same channel of a magnetic medium has a neutralizing transducer positioned lateral to either the read or write transducer with the neutralizing transducer having a winding connected in series or parallel but in phase opposition with the winding of the adjacent read or write transducer.

5 Claims, 9 Drawing Figures

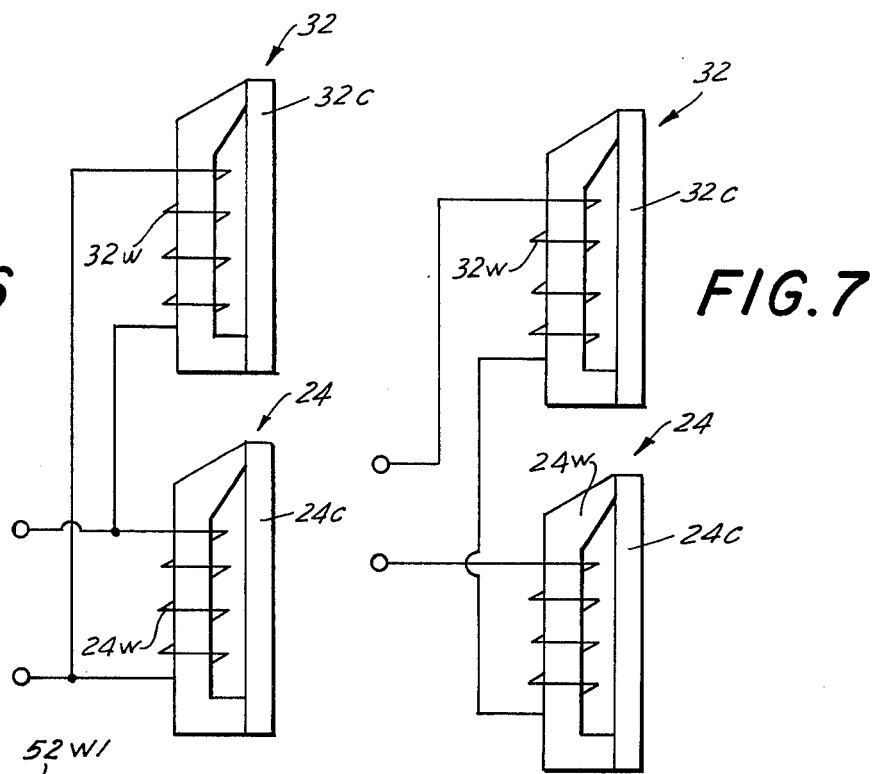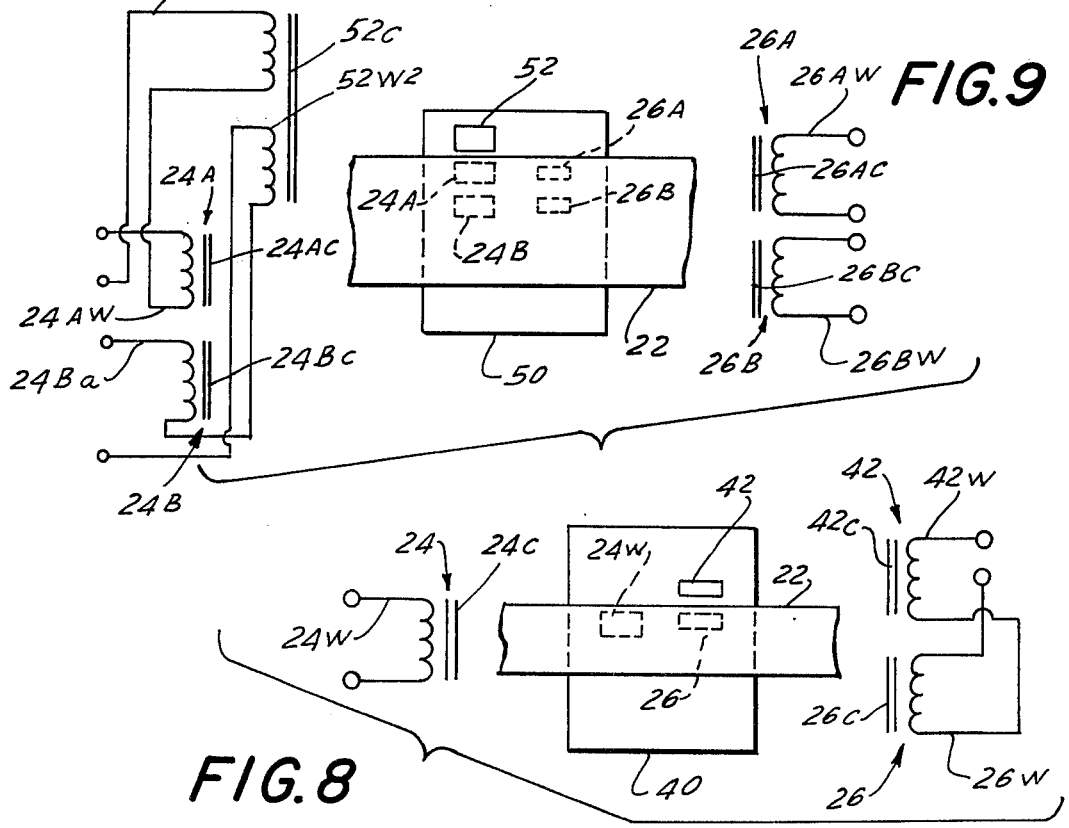

MAGNETIC HEAD STRUCTURE WITH MINIMUM FEEDTHROUGH

BACKGROUND OF THE INVENTION

This invention pertains to magnetic head structures and more particularly to magnetic head structures including writing and reading magnetic transducers in close proximity and operating at the same time.

With magnetic head structures where simultaneous reading and writing take place there is always the problem of feedthrough. Feedthrough is the signal measured at the read transducer with the magnetic medium stationary while the winding of the write transducer is fed a normal write current. In many currently available magnetic head structures this feedthrough signal is high enough to make the reliability of reading information signals questionable.

The feedthrough problem has been known for quite some time and many techniques have been developed to reduce its effects. One technique is to provide a conductive layer (copper or silver) over the surface of the writing and reading transducers with openings exposing the reading and writing gaps to allow magnetic medium contact with these. This shielding has a limited effect in that it reduces primarily the high frequency components of the feedthrough signal and does little for the lower frequency components of such signal. Another disadvantage of this technique is the high manufacturing costs associated with the forming or plating a conductive layer, then exposing the working gaps.

Another technique to achieve reduced feedthrough is to supply a shield with a coil wound on it to produce a magnetic field opposing the feedthrough field. This shield is placed between the writing and reading transducers and is oriented transversely to the movement of the magnetic medium (tape, drum, disc, etc). This technique requires a circuit for energizing the coil in response to operation of the writing transducer. This circuit must shape and phase the signal so that particular field is produced in the area of the read transducer gap for opposing and cancelling the feedthrough field. This technique does reduce the feedthrough signal somewhat, but again the costs associated with supplying a field producing shield in the center section and located between the read and write transducers is high. Also, the amount of room (most times under one-tenth of an inch) available in the center section is limited. This compounds the difficulty of supplying a field producing shield in this area. Furthermore, the field producing shield must be mechanically different from the cores of the read and write transducers further adding to the number of different parts required for the structure. This need for the neutralizing element to fit in center section of the structure and because of its mechanical difference from the other transducers, produces a compensating circuit which further adds to the cost and manufacturing problems of the head structure. It has been proposed to use a combination of these two methods and it has been claimed that a reduction of 100 to 1 has been achieved when both these methods are employed. The disadvantages to this approach are the high cost and manufacturing difficulties.

With other feedthrough neutralizing techniques circuits are provided which must be custom "tuned" or adjusted for each head structure.

It accordingly is a general object of the invention to provide an improved head structure.

It is another object of the invention to provide an improved head structure utilizing write and read transducers wherein the feedthrough signals have been reduced by a factor of a thousand.

It is a further object of the invention to provide an improved head structure utilizing write and read transducers wherein the feedthrough signals are reliably neutralized in a simple and inexpensive manner.

It is still a further object of the invention to provide a feedthrough signal neutralized head structure which requires no particular tuning or adjusting.

Briefly, the invention contemplates a magnetic head structure having first and second magnetic transducers each with a core-carrying winding. The magnetic transducers are positioned to cooperate with the same channel of the magnetic medium so that the first of the magnetic transducers is adapted to record signals on the medium while the second is adapted to reproduce the signals recorded by the first magnetic transducer. A neutralizing magnetic transducer having at least a winding is positioned laterally of one of the first and second magnetic transducers with the winding of the neutralizing magnetic transducer in a common circuit, but in phase opposition with the winding of one of the first and second magnetic transducers.

Other objects, the features and advantages of the invention will be apparent from the following detailed description when read with the accompanying drawing which show several embodiments of the invention.

In the drawing

FIG. 6 is a partially schematic representation of a parallel circuit including a neutralizing transducer with one of the reading or recording transducers;

FIG. 7 is a partially schematic representation of a series circuit including a neutralizing transducer with one of the reading or recording transducers;

FIG. 8 is a bottom view of a magnetic head structure wherein the neutralizing transducers are adjacent the read transducers; and FIG. 9 is a bottom view of a two-channel magnetic head structure with a schematic representation of the windings.

Figure 1:
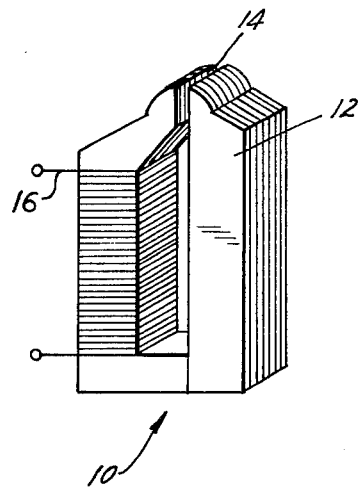
FIG. 1 shows a perspective view of a conventional magnetic transducer.

In FIG. 1 a magnetic transducer 10 is shown comprising a laminated core 12 with an active gap 14 and a winding 16. If a magnetic medium is moved past gap 14 the transducer can act as a record (write) transducer, or can act as a reproduce (read) transducer. If a recording current is fed to winding 16, a magnetic field is induced in gap 14. Most of this field enters the magnetic medium to store therein a magnetic representation of the recording current waveform. However, some of the field radiates in space. This radiation is the genesis of the feedthrough signal. On the other hand, if the magnetic medium which is moved past the gap 14 has magnetic representations stored thereon as a result of a previous recording by a record transducer, then these magnetic representations upon passing the gap 14 will induce signals in winding 16. However, the gap 14 and winding 16 may pick up stray magnetic fields and if these fields are generated by an adjacent writing transducer, the transducer 10 picks up these fields or signal feedthrough. Both the signals induced by the magnetic medium and the feedthrough signals are present across winding 16. Thus, it is seen that the magnetic transducer 10 can be either a record (write) transducer or a reproduce (read) transducer.

Figure 2:
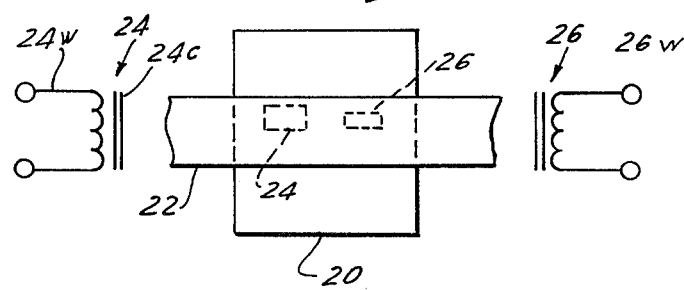
FIG. 2 is a bottom view of a prior art magnetic head structure along with a schematic representation of the windings.
Figure 3:
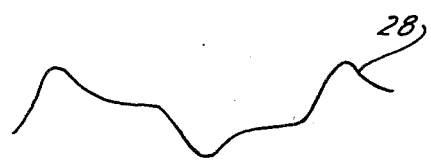
FIG. 3 is a waveform showing the feedthrough signal of the head structure of FIG. 2.

In FIG. 2 there is shown a magnetic head structure 20 past which moves magnetic tape 22 in the direction indicated by the arrow. Opposite one channel of tape 22 the head structure supports a record transducer 24 and downstream therefrom a reproduce transducer 26. Each of the transducers is similar to that shown in FIG. 1. However, FIG. 2 merely shows the pole tip region of the transducer about its core gap. In other words, the structure is seen as viewed by looking up through the magnet tape 22. The recording transducer 24 is also shown schematically comprising the winding 24W and the core 24C. Similarly the reproducing transducer 26 is shown schematically comprising the winding 26W and the core 26C. When a particular waveform of current is applied to winding 24W with the tape 22 stationary, the voltage waveform 28 of FIG. 2 is developed across the terminals of winding 26W because of signal feedthrough.

Figure 4:
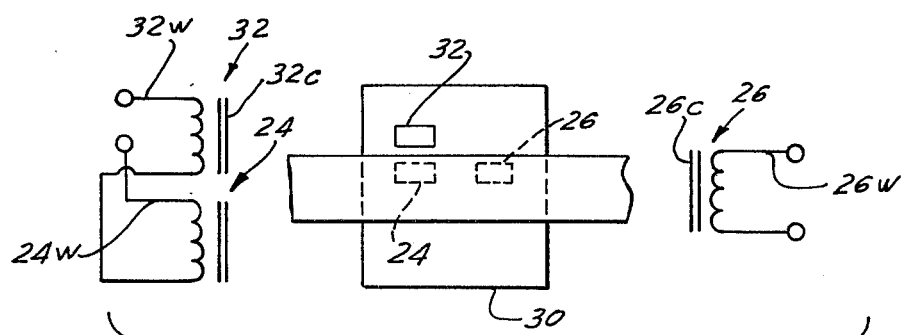
FIG. 4 is a bottom view of magnetic head structure according to one embodiment of the invention along with a schematic representation of the windings.
Figure 5:
FIG. 5 is a waveform showing the feedthrough signal of the head structure of FIG. 4.

In FIG. 4 there is shown the head structure 30 having the same record transducer 24 and the same reproduce transducer 26 aligned along the same channel of magnetic tape 22.

However, the head structure 30 supports a neutralizing transducer 32 lateral to record transducer 24. Neutralizing transducer 32 is similar to the transducer shown in FIG. 1 and has a core 32C and a winding 32W. The winding 32W is connected in a common circuit with winding 24W. The connection can be as shown in FIG. 6 with the windings in parallel or as shown in FIG. 7 with the windings in series. Generally, the nature of the recording circuit will determine which connection is preferred. In either event, as shown in FIGS. 4, 6, and 7 the windings are in phase opposition. Thus, when the transducer 24 radiates a magnetic field, the transducer 32 radiates an oppositely phased magnetic field into the same ambient region resulting in a cancellation of radiated fields in the region of reproduce transducer 26. Of course, neutralizing transducer 32 has little or no effect on the portion of magnetic tape immediately opposite the gap of recording transducer 24. In fact, the neutralizing transducer has practically no effect on any portion of the magnetic tape since it is located transversely beyond the tape. When the same waveform of current as was applied to the winding 24W of record transducer of FIG. 2 is applied to the winding 24 of the record transducer of FIG. 4 the voltage waveform 38 is developed across the terminals of winding 26W. In fact, it is not uncommon to reduce the signal feedthrough to less than one-half of a percent.

In FIG. 8 there is shown another embodiment of the invention wherein the head structure 40 is similar to the head structure 30 of FIG. 4 except that the neutralizing transducer 42 cooperates with reproduce transducer 26 instead of a neutralizing transducer 32 cooperating with record transducer 24. Although the winding 26W and 42W are connected in series they can be connected in parallel.

In FIG. 9 there is shown another embodiment of the invention wherein a single neutralizing transducer 52 services two channels. The first channel utilizes record transducer 24A and reproduce transducer 26A; and the second channel utilizes record transducer 24B and reproduce transducer 26B. The neutralizing transducer is positioned lateral to record transducer 24A and transversely beyond magnetic tape 22. Transducer 52 has: a first winding 52W1 connected in a common circuit with winding 24AW of the record transducer 24A but in phase opposition; and a second winding 52W2 connected in common circuit with winding 24BW of the record transducer 24B but in phase opposition. The common circuit connections can be in series as shown in FIG. 9, or in parallel. In addition the neutralizing transducer 52 can cooperate with the record transducer as shown in FIG. 9 or with the reproduce transducers. While the cores of the transducers can be different it simplifies the construction and number of parts by making the core of the neutralizing transducer identical to the core of one of the other transducers.

While only a limited number of embodiments have been shown and described in detail, there will now be obvious to those skilled in the art many modifications and variations satisfying many or all of the objects of the invention but which do not depart from the spirit of the invention as defined by the appended claims.

What is claimed is:

1. A magnetic head structure comprising first and second magnetic transducers each having a core with a winding disposed about the core, said first and second magnetic transducers being positioned for cooperation with a first channel of a magnetic medium and displaced from each other along said first channel, said first magnetic transducer being adapted to record signals on the first channel of the magnetic medium, said second magnetic transducer being adapted to reproduce signals previously recorded on the first channel of the magnetic medium by said first magnetic transducer, a third magnetic transducer similar to said first magnetic transducer, a fourth magnetic transducer similar to said second magnetic transducer, said third and fourth magnetic transducers being adjacent and laterally disposed to said first and second magnetic transducers, respectively, and positioned to cooperate with a second channel of the magnetic medium and displaced from each other along said second channel, said third magnetic transducer being adapted to record signals on the second channel of the magnetic medium, said fourth magnetic transducer being adapted to reproduce signals previously recorded on the second channel of the magnetic medium by said third magnetic transducer, a neutralizing magnetic transducer having first and second windings, said neutralizing magnetic transducer being laterally disposed with respect to said first or second magnetic transducer on the side thereof remote from the second channel, means for connecting said first winding of said neutralizing magnetic transducer in a common circuit but in phase opposition with the winding of said one of said first and second magnetic transducers and means for connecting said second winding of said neutralizing magnetic transducer in a common circuit but in phase opposition with the winding of the one of said third and fourth magnetic transducers which is adjacent the one of said first and second magnetic transducers laterally disposed to said neutralizing magnetic transducer.

2. The magnetic head structure of claim 1 wherein said first magnetic transducer is laterally disposed to said neutralizing magnetic transducer.

3. The magnetic head structure of claim 1 wherein said second magnetic transducer is laterally disposed to said neutralizing magnetic transducer.

4. The magnetic head structure of claim 1 wherein said neutralizing magnetic transducer has a core which is identical to the core of one of said first and second magnetic transducers.

5. The magnetic head structure of claim 1 wherein the first winding of said neutralizing magnetic transducer is connected in a common circuit with the winding of said one of said first and second magnetic transducer, and the second winding of said neutralizing magnetic transducer is connected in a common circuit with the winding of said one of said third and fourth magnetic transducers.

* * * * *